March 28, 1967  C. A. DAMM  3,311,335
SHIPPING SUPPORT WITH TIE-DOWN MEANS
Filed June 25, 1965
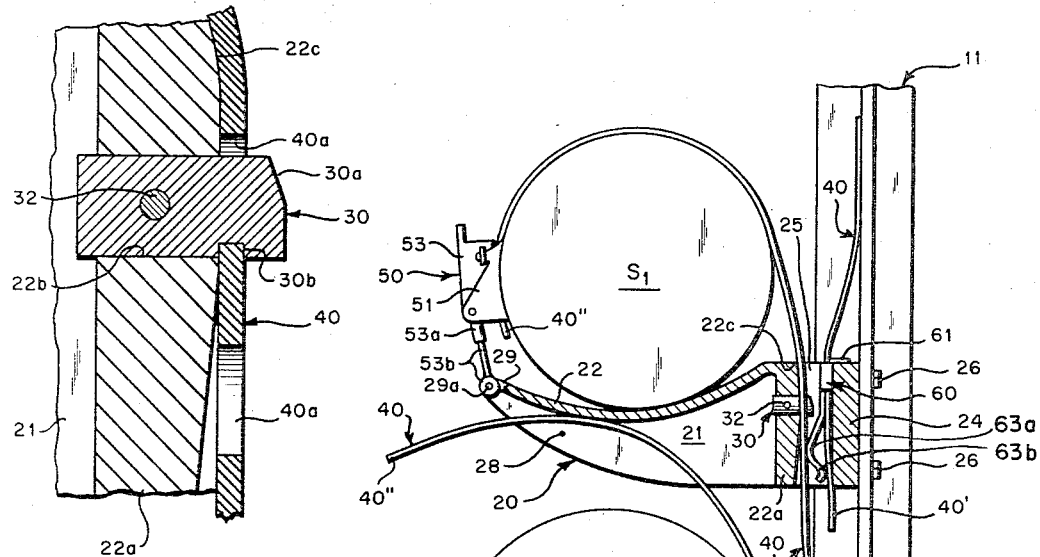
Fig. 3
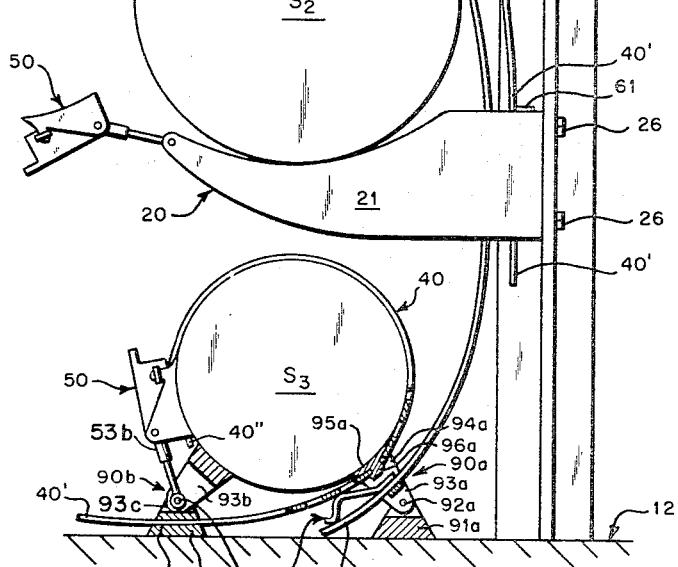
Fig. 1
Fig. 2
INVENTOR.
CARL A. DAMM
BY
ATTORNEYS

United States Patent Office 3,311,335
Patented Mar. 28, 1967

3,311,335
SHIPPING SUPPORT WITH TIE-DOWN MEANS
Carl A. Damm, Upper Black Eddy, Pa., assignor to the United States of America as represented by the Secretary of the Navy
Filed June 25, 1965, Ser. No. 467,148
10 Claims. (Cl. 248—119)

The invention described herein may be manufactured and used by or for the Government of the United States of America for governmental purposes without the payment of royalties thereon or therefor.

The present invention relates to a universal supporting and clamping arrangement and more particularly to a supporting and clamping arrangement for handling and storing military stores.

Handling, supporting and clamping methods for military stores, particularly aboard aircraft carriers, require speed, safety and strength. Present arrangements utilize mesh, cable or flexible straps for securing the store to its supporting chocks or supports. This arrangement requires the use of three handlers: one for lowering and positioning the store on a pair of supports by a drop chain or winch, and two other handlers at each end of the store for holding the mesh cable or strap out of the way while the store is being lowered on the support. If one of the flexible tie-down devices slips between the store and the support or stanchion, one of the handlers must reach over and around the store and retrieve the same. Any substantial lurching of the aircraft carrier may then cause the store to roll on the chock or support and pin the arm of the handler against the stanchion thereby injuring the individual. Further, under present conditions any significant movement of the aircraft carrier causes the free end of the tie-down strap or cable to fly about and create a hazardous condition to both personnel and material.

It is an object of the present invention to provide an inexpensive and safe supporting and clamping system which is capable of quick and efficient operation.

Another object of the present invention is to provide a universal supporting and clamping arrangement wherein the tie-down straps are easily adjustable to conform to specific object being handled and wherein the non-use position of the tie-down strap is out of the way but adjacent to the chock or support thereby permitting a one-man handling operation.

Various other objects and advantages will appear from the following description of an embodiment of the invention, and the novel features will be particularly pointed out hereinafter in connection with the appended claims.

In the drawing:

FIG. 1 illustrates an elevation view, partially in cross section, of the novel tie-down arrangement.

FIG. 2 illustrates, in perspective, the novel spring and excess strap arrangement of FIG. 1.

FIG. 3 illustrates, in cross section, the anchor lug of FIG. 1.

In the illustrated embodiment of the invention and specifically with reference to FIG. 1, the tie-down arrangement generally indicated at 10 includes a pair of stanchions 11, only one being shown, of I-beam configuration with spaced apart apertures, not shown, formed in the web portion 11a of the stanchion and along the length thereof. The stanchion 11 is anchored to a supporting surface 12 such as the deck of an aircraft carrier of the like.

A plurality of vertically stacked stanchion brackets each generally indicated at 20, extend outwardly from the stanchion 11 and support stores $S_1$, $S_2$ and $S_3$. It should be understood that although an additional stanchion is used and that a pair of brackets 20 are required to support each store, only one of the pair is shown in FIG. 1. Stanchion bracket 20 includes a pair of parallel longitudinally extending flange members 21 interconnected by an integral transverse web member 22, the upper surface of which together with the flange members 21 are configured to cradle the store $S_1$. The web member 22 terminates in a downwardly extending web plate 22a which is also secured to the flange members 21. An attachment plate 24, spaced from web plate 22a is also secured to the flange members 21 and thereby forms a downwardly extending recess 25. Fastening means 26 such as bolts or the like are secured to the attachment plate 24 and cooperate with the apertures in the web 11a of the stanchion 11 to removably position bracket 20 relative to stanchion 11. It should be observed that the flange members 21 and web member 22 cooperate to form a pocket 28 for purposes to be described more clearly below. The web 22 terminates short of the end of the pair of flanges 21 thereby giving rise to extended lugs 29. A pin 29a extending between and attached to the lugs 29 serves to pivotally connect a latch mechanism generally indicated at 50. The web 22 at the other end is slightly curved as at 22c to provide a fulcrum point, the purpose of which will be described below.

An anchor lug 30, as viewed in FIGS. 1 and 3, is positioned within a hole 22b formed in the web plate 22a and is connected to the latter by pin 32 and has one end thereof extending into the recess 25 formed between the flange members 21 and the plates 22a and 24. As viewed more clearly in FIG. 3, the pin 30 includes a ramp portion 30a in the upper portion thereof and a notch 30b in the lower portion thereof to receive a tie-down strap 40, now to be described.

Tie-down straps or bands 40 of the present invention are fabricated from strips of thin flat sheet material such as stainless steel, other high strength flexible sheet material, or the like, of the order of 2 inches in width and about $\frac{1}{32}$ of an inch in a preferred embodiment, and are provided with a series of regularly spaced circular apertures 40a of equal size and shape spaced at regular intervals along the length of the band 40. Adjustment of the effective length of the tie-down band is obtained by the selection of the proper apertures 40a and the insertion of cooperating elements therein. In order to facilitate the assembly of cooperating elements with the tie-down strap, the successive apertures may be identified by reference markings such as those indicated at 40b in FIG. 2. To facilitate handling of the tie-down straps, especially for one-man installation of objects of relatively large circumference, the elongated bands 40 are pre-shaped to a suitable predetermined circular configuration.

A latch assembly generally noted at 50 and of the type disclosed in U.S. Patent 3,086,809 to C. A. Damm for Universal Hoisting Sling, issued Apr. 23, 1963, includes an outer jaw, generally designated by the reference numeral 51 which receives the strap 40 in the manner illustrated by FIG. 2 of the above mentioned patent, and an inner jaw, generally designated by reference numeral 53. The latter includes an adjustment barrel 53a and an eye bolt 53b which is attached to the lug arrangement 29–29a of the bracket 20.

As seen more clearly in FIGS. 1 and 2 a spring member generally noted at 60 is interposed within the recess 25 and includes a rib portion 61 having an aperture 61a therethrough to receive a connecting means, not shown, for anchoring spring member 60 to the attachment plate 24 of the bracket 20. Spring member 60 includes a channel portion 62 for guiding the excess strap or strap end 40' from the bracket immediately above into the recess 25 formed in the bracket to thereby store the end 40' of the strap 40. The channel portion 62 terminates in a pair of spaced curved resilient finger springs 63 which have an upper spring node 63a for engaging strap 40 and pressing thereagainst to keep the same on the anchor lug 30. A lower spring node 63b separates the tie-down band 40 from the excess band 40′ and presses the latter against plate 24.

Referring again to FIG. 1, the store $S_3$ is supported on a pair of floor chocks 90a and 90b located and secured to the floor or deck 12 of the aircraft carrier. Chock 90a includes a clevis member 91a which through pin 92a pivotally connects a clevis sway brace 93a thereto. Brace 93a includes a transverse aperture 94a extending therethrough for receiving the excess band material 40′ from the band 40 associated with and cooperating with the bracket 20 immediately above store $S_3$. Brace 93a further includes a flat slightly curved base plate 95a which may be tapered to its opposite ends to accommodate the flexible band 40 with minimum discontinuities and thereby avoid excessive stress concentrations in the band or the fitting. In addition, the brace 93a includes an anchoring boss 96a projecting into the aperture 94a in order to engage any aperture 40a in the tie-down band 40. A spring member 60′ similar to that described above is secured to brace 93a and has the upper node thereof engaging the band 40 wrapped about store $S_3$ and the lower node thereof engaging the excess material or end 40′ of the upper band 40 associated with store $S_2$.

Chock member 90b includes an upwardly extending clevis member 91b which through pin 92b pivotally connects both the eye bolt 53b of the latch 50 and a clevis sway brace 93b. Brace 93b includes cam surfaces 93c for maintaining the sway brace in the illustrated position and terminates in a flat slightly curved portion for engaging the curvature of the store $S_3$. An aperture 97b extends through the clevis member 91b to receive the excess band material 40′ of the band 40 which encircles store $S_3$ and holds the same to the floor chocks 90a and 90b.

The operation and assembly procedure of the universal tie-down arrangement 10 is as follows: Initially, the band 40 is disengaged from the latch 50 and is in a separate storage location. Prior to placing the store upon the particular stanchion bracket 20, the band 40 is inserted in the recess 25 and pushed downwardly to the required band indicator setting 40b for the particular diameter store. During the downward movement the band 40 rides on the ramp 30a of the anchor lug 30 and cams the spring fingers 63 rearwardly toward the attachment plate 24. When the particular setting is reached, the band 40 is positioned with the anchor lug 30 passing through the aperture 40a in the strap 40. Band 40 is then pulled upwardly to engage the band in the notch 30b. It should be observed that the upper node 63a of the spring fingers 63 presses against the band 40 and keeps it on the anchor lug 30. The store is then properly placed upon the stanchion brackets and the upwardly extending band portion is then wrapped about the store and the terminal hole thereof is placed over the boss, not shown, in the jaw 51 of the latch 50. The latch 50 is then closed in the manner described in the patent relating thereto and the adjustment barrel is tightened, if required. The excess band material or end 40′ is then inserted within the channel portion 62 of the spring member 60 located below the store being secured and the lower node 63b of the spring finger 63 urges this band portion 40′ against plate 24. In the instance where store $S_2$ is secured, the excess band portion 40′ is inserted through the aperture 94a in the sway brace 93a and is retained by the spring member associated therewith.

In order to remove the store from its cradle position on the stranchion brackets 20 the latch 50 is opened and the terminal end of the band 40 is removed from the boss on the jaw 51. Because of the spring action thereof the band 40 will uncoil and store itself within the pocket 28 of the stanchion bracket 20 immediately above. Therefore, the band is out of the way and always at hand for future use. In order to change the setting of the band or to remove the same from the stranchion bracket 20, the band 40 is grasped slightly above the recess 25 and is urged toward the forward end of the bracket 20 and against the fulcrum at 22c. At the same time, a downward motion is imparted to the band which causes the same to disengage from the notch 30b and depress the spring fingers 63. The band may then be moved upwardly or downwardly as desired.

It will be understood that various changes in the details, materials, steps and arrangements of parts, which have been herein described and illustrated in order to explain the nature of the invention may be made by those skilled in the art within the principle and scope of the invention as expressed in the appended claims.

I claim:

1. A supporting and clamping bracket for use with perforated, precurved, tie-down straps in the vertical storage and handling of loads of varying sizes comprising:
 a bracket member;
 a recess extending downwardly through said bracket member;
 a strap extending into said recess;
 anchor lug means for engaging said strap and extending into said recess;
 spring means in said recess and secured to said bracket member, said spring means including a strap-receiving guide and spring fingers for urging said strap against the side of said recess.

2. The device as defined in claim 1 further including:
 a pocket formed in the underside of said bracket member to receive to strap.

3. The device as defined in claim 2 wherein said bracket member includes a curved upper surface for cradling a load disposable transverse to the longitudinal extent of said member.

4. The device as defined in claim 3 wherein said anchor lug means includes a ramp on the upper portion thereof to facilitate downward movement of said strap in said recess and notch means on the lower portion thereof for engaging the strap material bounding the perforation.

5. A supporting and clamping device for use with perforated, precurved, tie-down straps in the vertical storage and handling of loads of varying sizes, comprising:
 a longitudinally extending plurality of channel members each including a pair of spaced, parallel flanges and a web terminating adjacent one end of said flanges in a depending web plate; said flanges, web and web plate thereby forming a pocket in which straps may be stored when not in use;
 an attaching plate at said one end of said flanges, said plate being parallel to and spaced from said depending web plate, thereby forming a recess therebetween;
 straps extending into said recess;
 fastening means on said attaching plate;
 an anchor lug secured to said depending web plate and extending into said recess for engaging at least one of said straps;
 a spring member secured to said one of said plates, said spring member having a strap-receiving guide formed therein and depending spring fingers for urging said straps against said plates;
 and means at the other end of said channel member for connecting said one strap thereto.

6. The device as defined in claim 5 further including:
 a structural upright member;
 the plurality of said channel members secured to said upright member in vertically spaced relation;
 said strap means having perforations along the length thereof and being precurved;
 said strap-receiving guide receiving excess strap from the the channel member thereabove when that strap is in a tie-down position;

said spring fingers urging said one strap into locking engagement with said anchor lug means and urging said excess strap against said plates.

7. The device as defined in claim 5 wherein said channel member web has a curved supporting surface for receiving and cradling a load oriented transverse to the longitudinal extent of said channel member.

8. The device as defined in claim 5 wherein said anchor lug includes a ramp on the upper portion thereof to facilitate downward movement of said one strap in said recess and notch means on the lower portion thereof for engaging the strap material bounding the perforation.

9. A support device for vertically stacked stores comprising:
   a plurality of vertically spaced brackets each secured to said upright member;
   a recess extending downwardly through each of said brackets;
   latch means secured to each of said brackets;
   precurved strap means connected at one end thereof to said latch means, said strap means having perforations along the length thereof;
   anchor lug means on each of said brackets extending into the said recess and through one of said perforations in said strap means;
   and spring means secured to each of said brackets, said spring means including a guide for receiving excess strap material from the bracket spaced thereabove when that strap is in a tie-down position, said spring means including spring fingers for urging said precurved strap means into locking engagement with said anchor lug means and for urging the excess strap against the side of said recess.

10. The device as defined in claim 9 wherein said anchor lug means includes a ramp on the upper portion thereof to facilitate downward movement of said precurved strap means in said recess and notch means on the lower portion thereof for engaging the strap material bounding the perforation.

References Cited by the Examiner
UNITED STATES PATENTS

| | | | |
|---|---|---|---|
| 2,453,319 | 11/1948 | Hollyday | 248—74 |
| 3,119,585 | 1/1964 | Austenson | 248—44 |
| 3,175,799 | 3/1965 | Davis | 248—361 |
| 3,254,866 | 6/1966 | Hamrick | 248—74 |

References Cited by the Applicant
UNITED STATES PATENTS

| | | |
|---|---|---|
| 2,426,708 | 9/1947 | Robertson et al. |
| 3,087,700 | 4/1963 | Carpenter et al. |

CLAUDE A. LE ROY, *Primary Examiner.*

JOHN PETO, *Examiner.*